US012399779B2

(12) United States Patent
Nayak et al.

(10) Patent No.: US 12,399,779 B2
(45) Date of Patent: Aug. 26, 2025

(54) DEVICES, METHODS, AND COMPUTER-READABLE MEDIA TO BACK-UP PARITY INFORMATION

(71) Applicant: Sandisk Technologies, Inc., Milpitas, CA (US)

(72) Inventors: Dattatreya B Nayak, Udupi (IN); Vinod Sasidharan, Bengaluru (IN)

(73) Assignee: Sandisk Technologies, Inc., Milpitas, CA (US)

( * ) Notice: Subject to any disclaimer, the term of this patent is extended or adjusted under 35 U.S.C. 154(b) by 6 days.

(21) Appl. No.: 18/448,116

(22) Filed: Aug. 10, 2023

(65) Prior Publication Data
US 2024/0248799 A1 Jul. 25, 2024

Related U.S. Application Data

(60) Provisional application No. 63/481,315, filed on Jan. 24, 2023.

(51) Int. Cl.
*G06F 11/00* (2006.01)
*G06F 11/10* (2006.01)
*G06F 11/14* (2006.01)

(52) U.S. Cl.
CPC ........ *G06F 11/108* (2013.01); *G06F 11/1456* (2013.01)

(58) Field of Classification Search
CPC .. G06F 11/108; G06F 11/1456; G06F 3/0619; G06F 3/055; G06F 3/0679
See application file for complete search history.

(56) References Cited

U.S. PATENT DOCUMENTS

| 8,521,956 | B2 | 8/2013 | Della Pia et al. |
| 8,719,485 | B2 | 5/2014 | Sutardja et al. |
| 8,988,800 | B1* | 3/2015 | Varnica ............... G06F 11/1076 360/78.04 |
| 10,282,103 | B1* | 5/2019 | Stone ...................... G06F 13/24 |
| 10,474,527 | B1* | 11/2019 | Sun ..................... G06F 11/1068 |
| 10,872,012 | B2 | 12/2020 | Subramanian et al. |
| 2008/0082699 | A1 | 4/2008 | Alrod et al. |
| 2012/0047339 | A1* | 2/2012 | Decasper ............ G06F 11/1076 713/193 |
| 2016/0350391 | A1* | 12/2016 | Vijayan ................. G06F 3/0619 |
| 2017/0242606 | A1 | 8/2017 | Vlaiko et al. |

(Continued)

*Primary Examiner* — Craig S Goldschmidt
(74) *Attorney, Agent, or Firm* — Michael Best & Friedrich LLP

(57) ABSTRACT

Embodiments described herein provide a data storage device that backs-up parity information. The data storage device includes a memory and a data storage device controller coupled to the memory and including a storage sub-system and a security sub-system. The storage sub-system includes parity information within a second memory. The data storage device further includes a bus for transferring data between the data storage device controller and an external device in communication with the data storage device controller. The data storage device controller is configured to initiate a parity information back-up request, send, from the second memory of the storage sub-system, the parity information to the security sub-system based on the initiation of the parity information back-up request, and control the security sub-system to transmit the parity information to the external device.

20 Claims, 9 Drawing Sheets

(56) References Cited

U.S. PATENT DOCUMENTS

| | | |
|---|---|---|
| 2018/0232277 A1 | 8/2018 | Nelogal et al. |
| 2020/0005873 A1* | 1/2020 | Yazovitsky ......... G06F 11/1012 |
| 2020/0007169 A1 | 1/2020 | Lamberts et al. |
| 2021/0303736 A1 | 9/2021 | Kim |

* cited by examiner

DEVICES, METHODS, AND COMPUTER-READABLE MEDIA TO BACK-UP PARITY INFORMATION

CROSS-REFERENCE TO RELATED APPLICATION

This application claims priority to and the benefit of U.S. Provisional Patent Application No. 63/481,315, filed on Jan. 24, 2023, the entire contents of which is incorporated herein by reference.

FIELD

This application relates generally to data storage devices, and more particularly, to devices, methods, and computer-readable media for backing up a parity information generated by the data storage devices.

BACKGROUND

Flash memory is commonly used in everyday devices including smart telephones, computers, disk drives, and other electronic devices. Compared to other types of memory, flash memory is smaller in size, has relatively low power consumption, and is easier to interface electronically. However, flash memory may have failures, for example, program failures, silent read failures, and the like. These failures may result in data loss that may reduce the reliability of the data storage device.

SUMMARY

Conventional designs implement parity information (e.g., XOR snapshots) as a Flash Translation Layer (FTL) data in a static random access memory (SRAM) of a data storage device controller. During the run-time of a data storage device controller, the FTL transfers the parity information to NAND, thus consuming device time and dropping device performance. For example, bottlenecks may be caused by the FTL and a low layer (LL) transferring the parity information to the NAND and writing the parity information.

Additionally, conventional designs are prone to loss of data due to the parity information being stored in the SRAM, which is volatile and at risk of losing data. For example, the parity information may be corrupted based on the quality-grade and characteristics of the SRAM used in the data storage device controller and, thus, the parity information may be lost. As a result, if the parity information is required, conventional designs include the FTL performing a read operation from flash memory which provides additional strain to the data storage device.

The parity information may be stored in one or more SRAM banks of the SRAM, which is referred to herein as "XRAM" and is an abbreviation of XOR and SRAM. However, the storage of the parity information is not limited to XRAM and may be stored elsewhere in other types of memories (e.g., DRAM) that may be internal or external to the data storage device controller. Accordingly, there is a need to protect host data from the failures and issues described above.

To solve these and other problems, the embodiments described herein provide a stored back-up of parity information in a secured cached database using a Bluetooth® interface and a security processor. In particular, the embodiments described herein provide a data storage device controller with a user authentication-based access (for example, via Bluetooth®) for storing a back-up of the parity information in a user application. The data storage device controller includes a Storage Sub-System (StorSS) and a Security Sub-System (SecSS) that controls a Bluetooth® transceiver and provides the user authentication. Additionally, the embodiments described herein provide the technical advantage of increased device quality of service.

One embodiment of the present disclosure includes a data storage device. The data storage device includes a memory and a data storage device controller coupled to the memory and including a storage sub-system and a security sub-system. The storage sub-system includes parity information within a second memory. The data storage device further includes a bus for transferring data between the data storage device controller and an external device in communication with the data storage device controller. The data storage device controller is configured to initiate a parity information back-up request, send, from the second memory of the storage sub-system, the parity information to the security sub-system based on the initiation of the parity information back-up request, and control the security sub-system to transmit the parity information to the external device.

Another embodiment of the present disclosure includes a method of backing-up parity information. The method includes initiating, with an electronic processor, a parity information back-up request, controlling, with the electronic processor, a storage sub-system coupled to the electronic processor to send parity information from a memory of the storage sub-system to a security sub-system coupled to the electronic processor based on the initiation of a parity information back-up request, and controlling, with the electronic processor, the security sub-system to transmit the parity information to an external device.

Yet another embodiment of the present disclosure includes a non-transitory computer readable medium coupled to an electronic processor. The non-transitory computer readable medium includes computer executable instructions stored in therein that, when executed by the electronic processor, enable the electronic processor to initiate a parity information back-up request, control a storage sub-system coupled to send parity information from a memory of a storage sub-system to a security sub-system coupled to the electronic processor based on the initiation of a parity information back-up request, and control the security sub-system to transmit the parity information to an external device.

Various aspects of the present disclosure provide for improvements data storage devices. The present disclosure can be embodied in various forms, including hardware or circuits controlled by software, firmware, or a combination thereof. The foregoing summary is intended solely to give a general idea of various aspects of the present disclosure and does not limit the scope of the present disclosure in any way.

DETAILED DESCRIPTION

In the following description, numerous details are set forth, such as data storage device configurations, controller operations, and the like, in order to provide an understanding of one or more aspects of the present disclosure. It will be readily apparent to one skilled in the art that these specific details are merely exemplary and not intended to limit the scope of this application. In particular, the functions associated with the data storage device controller can be performed by hardware (for example, analog or digital circuits), a combination of hardware and software (for example, program code or firmware stored in a non-transitory computer-readable medium that is executed by a processor or control circuitry), or any other suitable means. The following description is intended solely to give a general idea of various aspects of the present disclosure and does not limit the scope of the disclosure in any way. Furthermore, it will be apparent to those of skill in the art that, although the present disclosure refers to NAND flash, the concepts discussed herein are applicable to other types of solid-state memory, such as NOR, PCM ("Phase Change Memory"), ReRAM, MRAM, etc.

Figure 1:
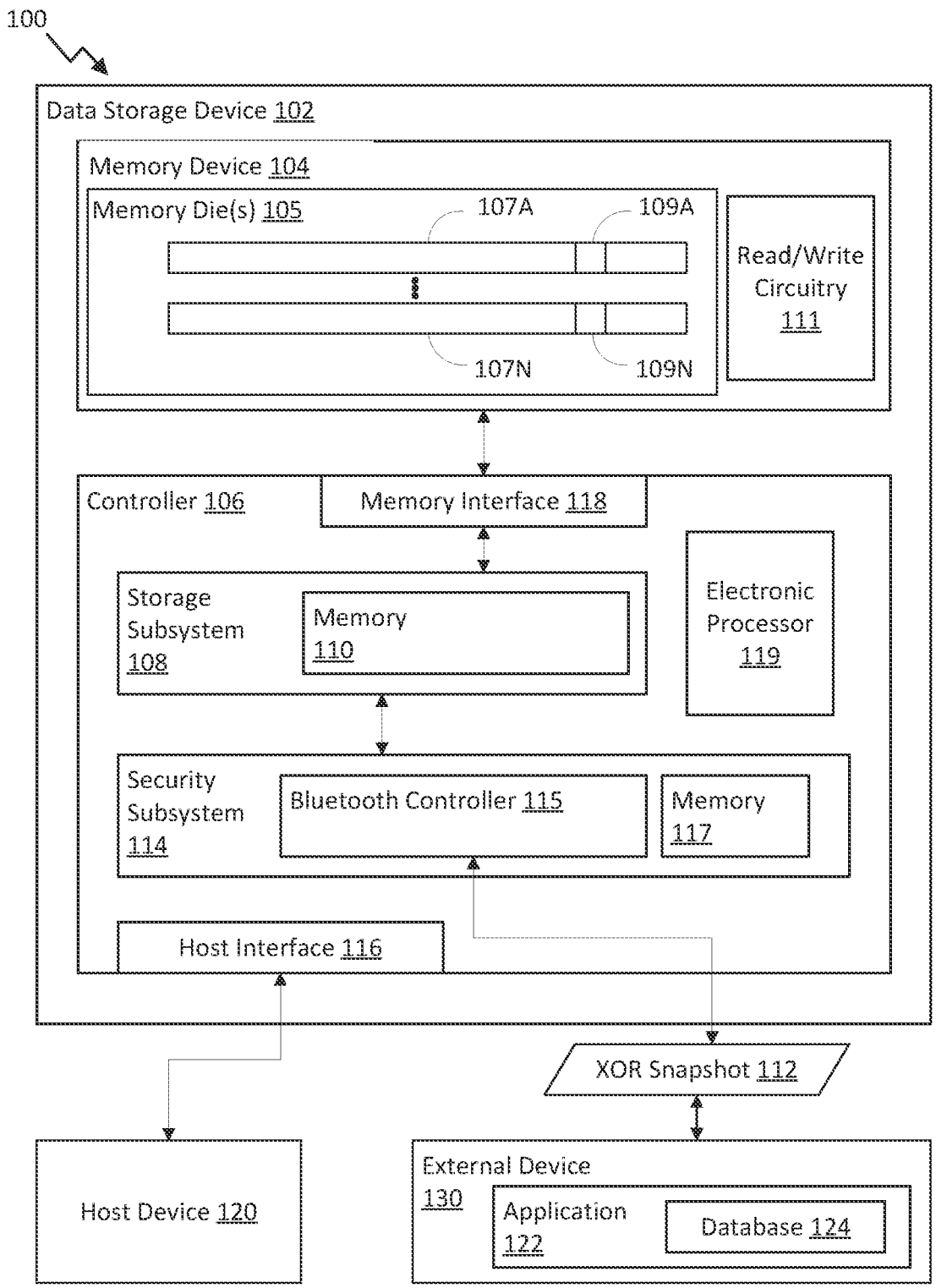
FIG. 1 is block diagram of a system including a data storage device, a host device, and an external device, in accordance with some embodiments of the disclosure.

FIG. 1 is block diagram of a system including a data storage device, a host device, and an external device, in accordance with some embodiments of the disclosure. In the example of FIG. 1, the system 100 includes a data storage device 102, a host device 120, and an external device 130. In some embodiments, the system 100 may include multiple data storage device and/or multiple external devices. The data storage device 102 includes a controller 106 (referred to hereinafter as "data storage device controller") and a memory device 104 (e.g., non-volatile memory) that is coupled to the data storage device controller 106.

One example of the structural and functional features provided by the data storage device controller 106 is illustrated in FIG. 1 in a simplified form. One skilled in the art would also recognize that the data storage device controller 106 may include additional modules or components other than those specifically illustrated in FIG. 1. Additionally, although the data storage device 102 is illustrated in FIG. 1 as including the data storage device controller 106, in other implementations, the data storage device controller 106 is instead located separate from the data storage device 102. As a result, operations that would normally be performed by the data storage device controller 106 described herein may be performed by another device that connects to the data storage device 102.

The data storage device 102 and the host device 120 may be operationally coupled via a connection (e.g., a communication path), such as a bus or a wireless connection. In some examples, the data storage device 102 may be embedded within the host device 120. Alternatively, in other examples, the data storage device 102 may be removable from the host device 120 (i.e., "removably" coupled to the host device 120). As an example, the data storage device 102 may be removably coupled to the host device 120 in accordance with a removable universal serial bus (USB) configuration. In some implementations, the data storage device 102 may include or correspond to a solid-state drive (SSD), which may be used as an embedded storage drive (e.g., a mobile embedded storage drive), an enterprise storage drive (ESD), a client storage device, or a cloud storage drive, or other suitable storage drives.

The data storage device 102 and the external device 130 may be operationally coupled via a connection (e.g., a communication path), such as a bus or a wireless connection. In some examples, the data storage device 102 communicates with the external device 130 via a Bluetooth® connection. In some embodiments, parity information may be sent between the data storage device 102 and the external device 130, as will be described in greater detail below.

The data storage device 102 may be configured to be coupled to the host device 120 via the communication path, such as a wired communication path and/or a wireless communication path. For example, the data storage device 102 may include an interface 116 (e.g., a host interface) that enables communication via the communication path between the data storage device 102 and the host device 120, such as when the interface 116 is communicatively coupled to the host device 120. In some embodiments, wireless communication may be conducted using Bluetooth®. For example, the data storage device controller 106 may include a Bluetooth® communication component (e.g., Bluetooth® controller 115) that communicates with a Bluetooth® communication component of the host device 120. Parity information may be sent between the data storage device 102 and the host device 120.

The host device 120 may include an electronic processor and a memory. The memory may be configured to store data and/or instructions that may be executable by the electronic processor. The memory may be a single memory or may include one or more memories, such as one or more non-volatile memories, one or more volatile memories, or a combination thereof. In some embodiments, the memory of the host device 120 may include a database for storing parity information from the data storage device 102. The host device 120 may issue one or more commands to the data storage device 102, such as one or more requests to erase data at, read data from, or write data to the memory 104 of the data storage device 102. Additionally, the host device 120 may issue one or more vendor specific commands to the data storage device 102 to notify and/or configure the data storage device 102. For example, the host device 120 may be configured to provide data, such as user data, to be stored at the memory 104 or to request data to be read from the memory 104. The host device 120 may include a mobile smartphone, a music player, a video player, a gaming console, an electronic book reader, a personal digital assistant (PDA), a computer, such as a laptop computer or notebook computer, any combination thereof, or other suitable electronic device.

The host device 120 communicates via a memory interface that enables reading from the memory device 104 and writing to the memory device 104. In some examples, the host device 120 may operate in compliance with an industry specification, a Secure Digital (SD) Host Controller specification, or other suitable industry specification. The host device 120 may also communicate with the memory device 104 in accordance with any other suitable communication protocol (e.g., Bluetooth®). For example, the host device 120 may receive parity information via Bluetooth® communication.

Figure 4:
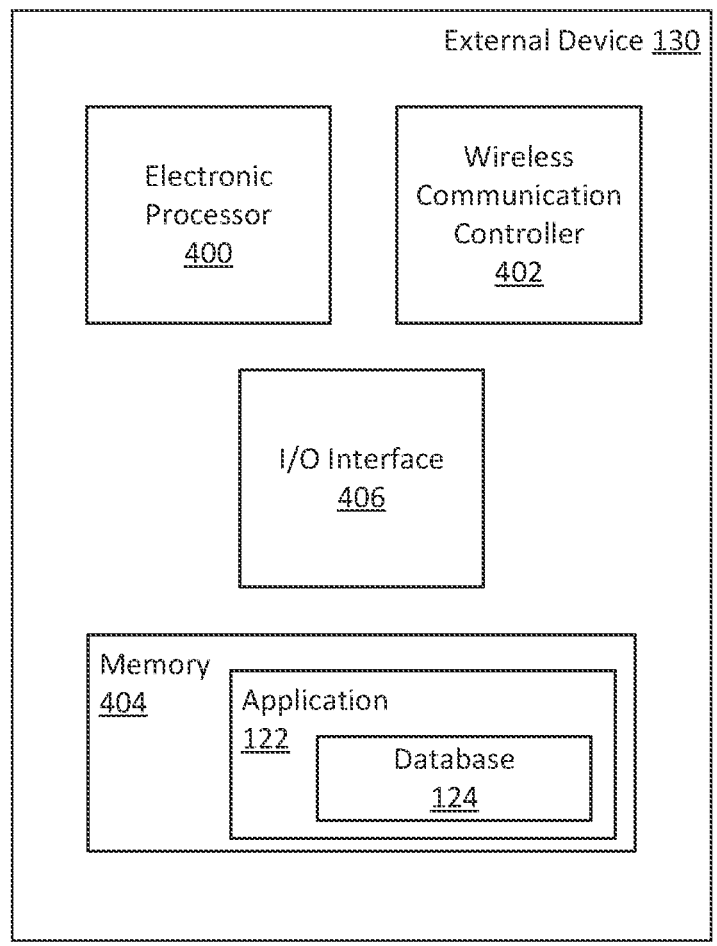
FIG. 4 is a block diagram of the external device of FIG. 1, in accordance with some embodiments of the disclosure.

The external device 130 may include an application 122 and an electronic processor, such as electronic processor 400 (FIG. 4). The application 122 may include a database 124 that is a secured cached memory. In some embodiments, the application 122 hosts the database 124. The internal mapping of the database 124 and the contents of the database 124 may be taken care by the application 122 and/or the database 124, internally. The data storage device 102 may send and retrieve parity information from the external device 130 to back-up the parity information in the external device 130. For example, parity information may include a XOR snapshot, such as XOR snapshot 112. In some embodiments, the XOR snapshot 112 may be parity information that corresponds to data. In some embodiments, the data storage device 102 may send and retrieve any device data from the external device 130 to back-up the device data in the external device 130. The external device 130 may execute the application 122 which may store the XOR snapshot 112 in the database 124 upon receipt of the XOR snapshot 112 from the security sub-system 114. In some embodiments, the application 122 is stored in a memory, such as memory 404 (FIG. 4) of the external device 130. The external device 130 may include a mobile smartphone, a music player, a video player, a gaming console, an electronic book reader, a personal digital assistant (PDA), a computer, such as a laptop computer or notebook computer, a dedicated parity information storage device, any combination thereof, or other suitable electronic device. For example, the dedicated parity information storage device may be a wireless, external device that is dedicated to receiving and storing the parity information. The external device 130 may include a security setting that may lock and unlock the database 124 based on an input. For example, the input may be one of a fingerprint reading, a facial recognition reading, or a passcode that is input. In some embodiments, an input may be received before execution of the application 122. The dedicated parity information storage device may be an addition onto the system 100. In some embodiments, the application 122 is pre-installed on the dedicated parity information storage device. Alternatively, in some embodiments, the application 122 is installed on the dedicated parity information storage device by a user. For example, the application may be installed via a user interface of the dedicated parity information storage device, or via an external device, such as host device 120 or external device 130.

The memory device 104 of the data storage device 102 may include a non-volatile memory (e.g., NAND, NOR, 3D NAND family of memories, or other suitable memory). In some examples, the memory device 104 may be any type of flash memory. For example, the memory device 104 may be two-dimensional (2D) memory or three-dimensional (3D) flash memory. The memory device 104 may include one or more memory dies 105. Each of the one or more memory dies 105 may include one or more blocks (e.g., one or more erase blocks). Each block may include one or more groups of storage elements, such as a representative group of storage elements 107A-107N. The group of storage elements 107A-107N may be configured as a word line. The group of storage elements 107 may include multiple storage elements, such as a representative storage elements 109A and 109N, respectively.

The memory device 104 may include support circuitry, such as read/write circuitry 111, to support operation of the one or more memory dies 105. Although depicted as a single component, the read/write circuitry 111 may be divided into separate components of the memory device 104, such as read circuitry and write circuitry. The read/write circuitry 111 may be external to the one or more memory dies 105 of the memory device 104. Alternatively, one or more individual memory dies may include corresponding read/write circuitry that is operable to read from and/or write to storage elements within the individual memory die independent of any other read and/or write operations at any of the other memory dies.

The data storage device 102 includes the data storage device controller 106 coupled to the memory device 104 (e.g., the one or more memory dies 103) via a bus, an interface (e.g., interface circuitry), another structure, or a combination thereof. For example, the bus may include multiple distinct channels to enable the data storage device controller 106 to communicate with each of the one or more memory dies 103 in parallel with, and independently of, communication with the other memory dies 103. In some implementations, the memory device 104 may be a flash memory.

The data storage device controller 106 is configured to receive data and instructions from the host device 120 and/or the external device 130 and to send data to the host device 120 and/or the external device 130. For example, the data storage device controller 106 may send data to the host device 120 via the host interface 116, and the data storage device controller 106 may receive data from the host device 120 via the host interface 116. While data is being sent to and from the host device 120 via the host interface, parity information (e.g., the XOR Snapshot 112) may be sent to and from the data storage device controller 106 to the external device 130 via a wireless connection (e.g., Bluetooth®). The data storage device controller 106 is configured to send data and commands to the memory device 104 and to receive data from the memory device 104. For example, the data storage device controller 106 is configured to send data and a write command to cause the memory device 104 to store data to a specified address of the memory device 104 via the memory interface 118. The write command may specify a physical address of a portion of the memory device 104 (e.g., a physical address of a word line of the memory device 104) that is to store the data, as well as a size (for example, 2 k, 4 k, etc.) of the data to be written.

The data storage device controller 106 is configured to send a read command to the memory device 104 to access data from a specified address of the memory device 104. The read command may specify the physical address of a region of the memory device 104 (e.g., a physical address of a word line of the memory device 104). The data storage device controller 106 may also be configured to send data and commands to the memory device 104 associated with background scanning operations, garbage collection operations, and/or wear-leveling operations, or other suitable memory operations.

The data storage device controller 106 may include a storage sub-system 108, a security sub-system 114, and an electronic processor 119. In some embodiments, the storage sub-system 108 and the security sub-system 114 may include their own, dedicated electronic processors.

The storage sub-system 108 may include a storage memory 110 (for example, SRAM including the XRAM, a read-only memory ("ROM"), a non-transitory computer readable medium, or a combination thereof). In some embodiments, the storage memory 110 may include the XRAM storing parity information (e.g., an XOR snapshot 112) that may be used in a data recovery process. Data recovery in the storage memory 110 is possible through a XOR computation process executed by the storage sub-system 108. For example, the XOR computation process includes finding parity data (P) for data, dataB, dataC according to the following: P=(data^ dataB^dataC). To retrieve dataB from the storage memory 110, the storage subsystem 108 may use the following: dataB=(P^data^-dataC). In some embodiments, access to the XRAM is contingent on traditional ASIC memory usage guidelines. The storage memory 110 may store the XOR Snapshot 112 as described in greater detail with respect to FIGS. 2 and 3.

The security sub-system 114 may include a Bluetooth® controller 115 and a memory 117. The Bluetooth® controller 115 may include a transceiver for communicating with the external device 130 via the Bluetooth® protocol. In some embodiments, the security sub-system includes a Wi-Fi transceiver for communicating with the external device 130. The memory 117 may be an SRAM including the XRAM. In some embodiments, the parity information (e.g., the XOR snapshot 112) may be backed-up by the security sub-system 114 in the memory 117. The storage sub-system 108 and the security sub-system 114 may communicate with each other via a wired or wireless connection. For example, the storage sub-system 108 and the security sub-system 114 may communicate via a bus within the data storage device controller 106. The electronic processor 119 may facilitate communication between the storage sub-system 108 and the security sub-system 114.

The electronic processor 119 of the data storage device controller 106 may send a memory operation (e.g., a write command) to the memory device 104 to cause the read/write circuitry 111 to write the XOR snapshot 112 to a storage element of the memory device 104. For example, the data storage device controller 106 may send the write command to the memory device 104 in response to receiving a request for write access from the host device 120 and/or the external device 130. Additionally, the electronic processor 119 may send a memory operation (e.g., a store command and/or a retrieve command) from the Bluetooth® controller 115 to the storage memory 110. The electronic processor 119 may also send a memory operation (e.g., a retrieve command and/or a store command) from the Bluetooth® controller 115 to the external device 130. In the case that the storage sub-system 108 and the security sub-system 114 include their own electronic processors, they may be substantially the same as electronic processor 119.

As noted above, embodiments described herein provide parity information back-up, such as a XOR snapshot 112 back-up using a Bluetooth® transceiver, such as the transceiver of Bluetooth® controller 115. The XOR snapshot 112 back-up described herein will be described with reference to FIGS. 2 and 3.

Figure 2:
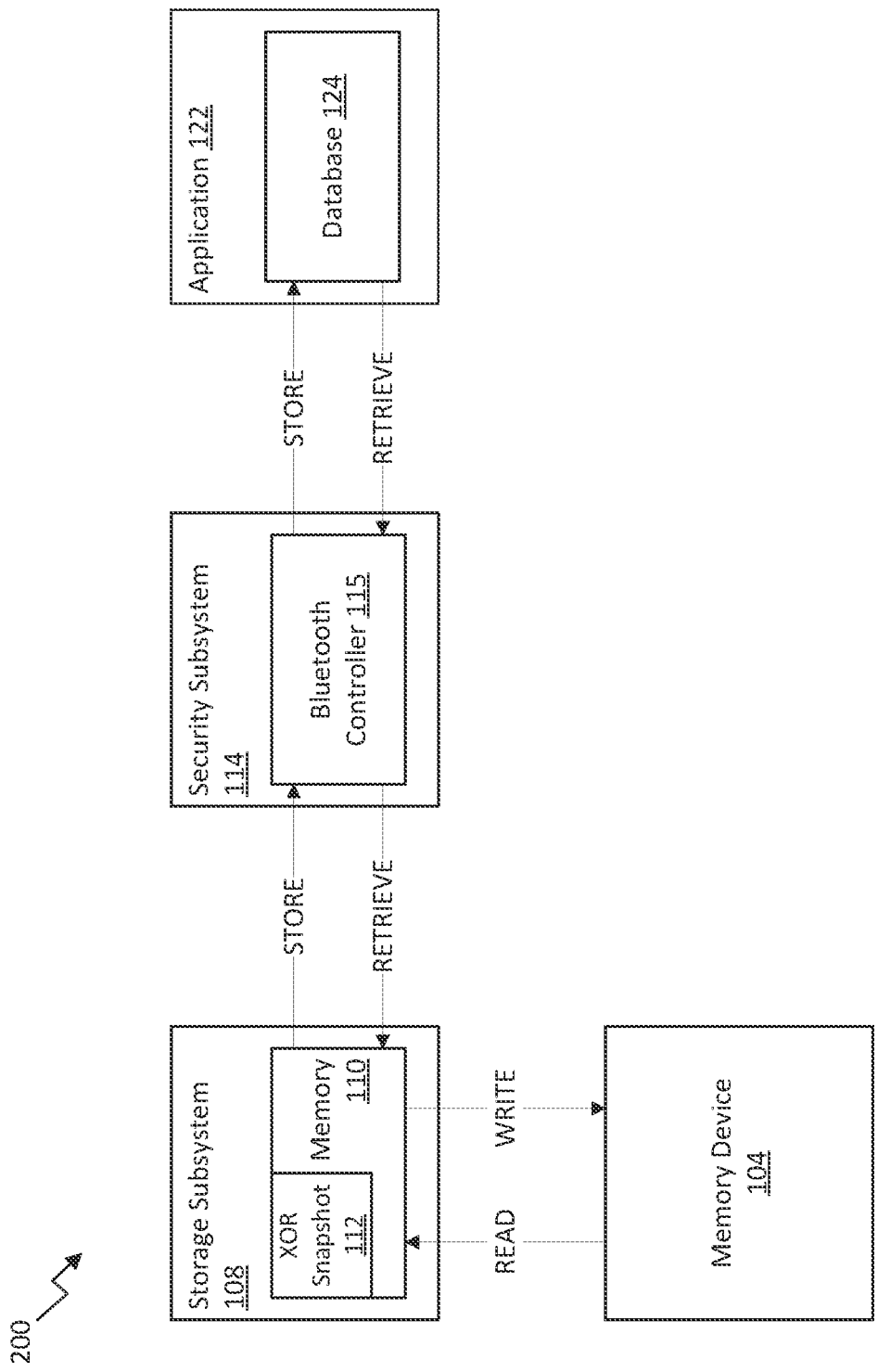
FIG. 2 is a diagram illustrating a first example back-up system, in accordance with some embodiments of the disclosure.

FIG. 2 illustrates a first example back-up system 200 for backing up parity information, according to some embodiments. The system 200 includes the memory device 104, the storage sub-system 108, the security sub-system 114, and the application 122. In some embodiments, the system 200 may not include the application 122 and may instead back up the parity information in the security sub-system 114. The system backs up the parity information (e.g., the XOR snapshot 112) using the Bluetooth® controller 115 of the security sub-system 114, which mimics the write operation to the memory device 104. In some embodiments, the XOR snapshot 112 is a part of the storage memory 110 of the storage sub-system 108. In some embodiments, the XOR snapshot 112 is backed up from the storage memory 110 of the storage sub-system 108 to the database 124 of the application 122 via the Bluetooth® controller 115 when the application 122 is executed by one of the host device 120 and the external device 130. For example, the XOR snapshot 112 may be backed up at a fixed time interval and/or during a power down of the data storage device 102. In some embodiments, the application 122 may be stored in a memory of the host device 120. Alternatively, or additionally, the application 122 may be stored in a memory (e.g., memory 404) of the external device 130.

The storage sub-system 108 may include a FTL that is executed by the storage sub-system 108 to generate the parity information (e.g., the XOR snapshot 112) based on requirements (e.g., system performance and system power). In some embodiments, the parity information is generated through a low-density parity-check code (LDPC) engine as part of an encode operation (e.g., executed by the storage sub-system 108). In some embodiments, the generated parity information may include complete logical block addressing (LBA) range and internal device data (e.g., customer data stored in the data storage device 102). Alternatively, in some embodiments, internal device data may be the generated parity information. In some embodiments, the XOR snapshot is in the range of 32-64 kilobits (KB). The computed XOR snapshot 112 is then stored in the storage memory 110. Conventionally, the FTL writes the XOR snapshot 112 to the memory device 104 to back-up the XOR snapshot 112. For example, the FTL of the storage sub-system 108 writes the XOR snapshot 112 to NAND of the memory device 104. In some embodiments, an error correction code (ECC) engine accumulates the data to be the XOR snapshot 112 when requested by the FTL. However, writing the XOR snapshot 112 to the NAND of the memory device 104 may stall or delay other data storage device 102 operations to accommodate the XOR snapshot 112 due to the data path transfers of the NAND needing to be in a synchronized state to avoid race conditions and incorrect write to the storage memory 110 from the NAND of the memory device 104. In order to mitigate the stalling of the data storage device 102, the XOR snapshot 112 may be backed up to the database 124 using Bluetooth® via the security sub-system 114.

Figure 3:
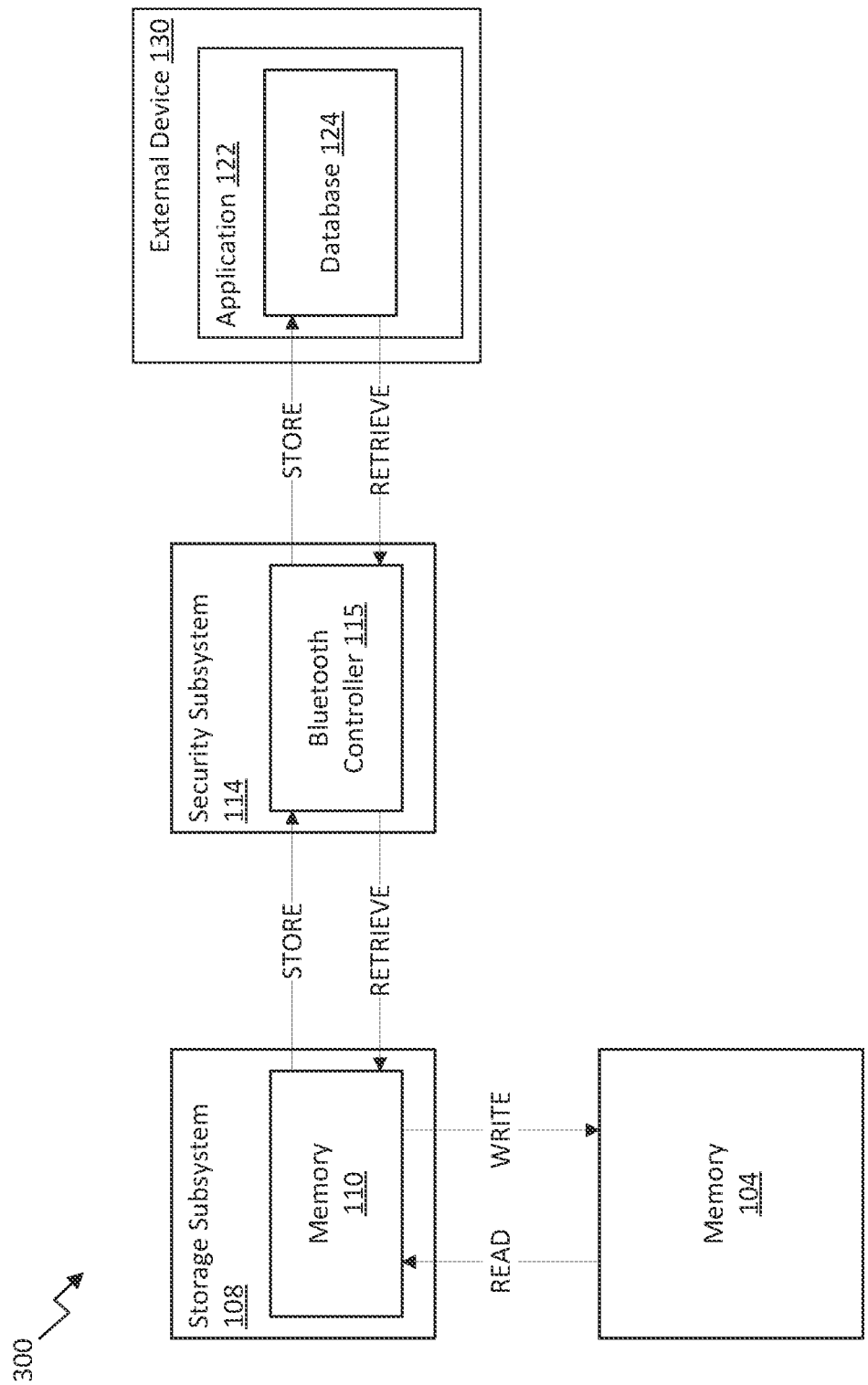
FIG. 3 is a diagram illustrating a second example back-up system, in accordance with some embodiments of the disclosure.

When the XOR snapshot 112 is backed up (e.g., at a fixed time interval and/or during a power down), the storage sub-system 108 initiates a parity information request to the security sub-system 114. The security sub-system 114 may receive the XOR snapshot 112 from the storage sub-system 108 and then initiate a back-up in the database 124 of the application 122 via Bluetooth®. For example, the Bluetooth® controller 115 may store the XOR snapshot 112 in the database 124 when the application 122 is executed by one of the host device 120 and the external device 130 (FIG. 3). In some embodiments, the security sub-system 114 may add security measures when storing the XOR snapshot to the database 124 and when retrieving the XOR snapshot 112 from the database 124. For example, the security sub-system 114 may encrypt the XOR snapshot 112 using cryptography protocols such as RSA®, elliptic curve cryptography, Advanced Encryption Standard-XTS (AES-XTS), AES-CBC, or other suitable encryption algorithms. Backing up the XOR snapshot 112 in the database 124 provides a dedicated memory for the XOR snapshot 112 without relying on the NAND of the memory 104, thus, mitigating any bottlenecking with respect to other memory operations.

In some embodiments, the security sub-system 114 may include a memory, such as memory 117 (FIG. 1), that the XOR snapshot 112 is stored in, in addition to, in place of, or while waiting to back up the XOR snapshot 112 to the database 124. Backing up the XOR snapshot 112 to the database 124 and the memory 117 of the security sub-system 114 may reduce latency with respect to the NAND of the memory 104.

FIG. 3 illustrates a second example back-up system 300 for backing up parity information, according to some embodiments. The system 300 includes the memory device 104, the storage sub-system 108, the security sub-system 114, and the external device 130. The external device 130 will be described in detail with respect to FIG. 4, below. The system backs up parity information (e.g., the XOR snapshot 112) to the external device 130, using the Bluetooth® controller 115 of the security sub-system 114, which mimics the internal write operation to the memory device 104 of the data storage device 102. In some embodiments, the XOR snapshot 112 is a part of the storage memory 110 of the storage sub-system 108. The XOR snapshot 112 is backed up from the storage memory 110 of the storage sub-system 108 to the database 124 of the application 122 via the Bluetooth® controller 115 in response to a request from the storage sub-system 108 to the security sub-system 114. In some embodiments, the XOR snapshot 112 may be backed up at a fixed time interval and/or during a power down of the data storage device 102. For example, the fixed time interval may be in the range of 0.5 seconds ("s") and 30 s.

When the XOR snapshot 112 is backed up (e.g., at a fixed time interval and/or during a power down), the storage sub-system 108 initiates a parity information back-up request to the security sub-system 114. The security sub-system 114 may obtain the XOR snapshot 112 and then initiate a back-up in the external device 130 via Bluetooth®. For example, the Bluetooth® controller 115 may output the XOR snapshot 112 to the external device 130, which executes the application 122, thus, storing the XOR snapshot 112 in the database 124. In some embodiments, the security sub-system 114 may add security measures when storing the XOR snapshot to the external device 130 and when retrieving the XOR snapshot 112 from the external device 130. For example, the security sub-system 114 may encrypt the XOR snapshot 112. Backing up the XOR snapshot 112 in the external device 130, and in particular the database 124, provides a dedicated memory for the XOR snapshot 112, thus, mitigating any bottlenecking from other memory operations.

FIG. 4 is a block diagram of the external device 130, according to some embodiments. The external device 130 may be a separate device from the data storage device 102. For example, the external device 130 may be an external hard drive, a server that communicates with the data storage device 102 via Bluetooth®, a mobile phone, a computer or any other device with wireless communication capabilities. In some embodiments, the external device 130 may receive parity information from multiple data storage devices. For example, one external device 130 may be used to store a first XOR snapshot from a first data storage device and a second XOR snapshot from a second data storage device. The external device 130 may include an electronic processor 400, a wireless communication controller 402, a memory 404, and an input/output (I/O) interface 406. The memory 404 may store the application 122, which may be executed by the electronic processor 400 to facilitate storing of the parity information received from Bluetooth® controller 115 of the security sub-system 114 in the memory 404. In some embodiments, the application 122 may include the database 124 for storing the XOR snapshot 112 received from the Bluetooth® controller 115. In some embodiments, the application 122 may be downloadable to the external device 130. Alternatively, in some embodiments, the application 122 may be pre-downloaded to the memory 404 of the external device 130. In some embodiments, the memory 404 may store the first XOR snapshot from the first data storage device and the second XOR snapshot from the second data storage device. For example, the database 124 may store both the first XOR snapshot and the second XOR snapshot. In addition to storing the XOR snapshot 112, the memory 404 may be configured to store data and/or instructions that may be executable by the electronic processor. For example, the memory 404 may be a random access memory ("RAM"). The application 122 may store the XOR snapshot 112 in the database 134 using Bluetooth® protocol. The memory may be a single memory or may include one or more memories, such as one or more non-volatile memories, one or more volatile memories, or a combination thereof. In some embodiments, the external device 130 may include any number of components and is not limited to the components illustrated.

The electronic processor 400 may facilitate communication between the Bluetooth® controller 115 of the security sub-system 114 and the wireless communication controller 402. The wireless communication controller 402 enables the external device 130 to communicate with the data storage device 102 that includes the Bluetooth® controller 115 of the security sub-system 114. In some embodiments, the wireless communication controller 402 stores the application 122 and database 124. In some embodiments, the wireless communication controller 402 is a Bluetooth® controller. The wireless communication controller 402 communicates with the security sub-system 114 employing the Bluetooth® protocol. Therefore, in the illustrated embodiment, the external device 130 and the data storage device 102 are within a communication range (i.e., in proximity) of each other while they exchange data. In some embodiments, the wireless communication controller 402 communicates with the wireless transceiver of the security sub-system 114 over a Wi-Fi network.

The I/O interface 406 may receive input from a graphical user interface. In some embodiments, the graphical user interface may display a first screen of the application 122. For example, a user may set a fixed time interval for backing up the parity information (e.g., XOR snapshot 112) via the application displayed on the graphical user interface. The I/O interface 406 may receive input and the electronic processor 400 may facilitate the back-up of the parity information received by the wireless communication controller 402 from the Bluetooth® controller 115, in the database 124. In some embodiments, the I/O interface 406 can simultaneously receive inputs as the parity information is provided to the database 124 via Bluetooth®.

Figure 5:
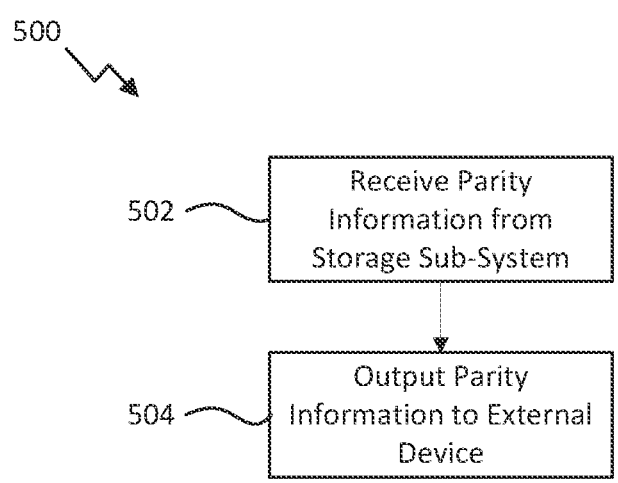
FIG. 5 is a flowchart illustrating a process for outputting parity information to an external device, in accordance with some embodiments of the disclosure.

FIG. 5 is a flowchart illustrating a method 500 for outputting parity information to an external device, according to some embodiments. It is understood that the process 500 may be stored in a memory, such as memory device 104, and executed by a processor, such as processor 119. However, it is contemplated that some or all of the process 500 may be performed on the memory device 104, such as via the read/write circuitry 111. Accordingly, while the process 500 is described in regards to the controller 106 and in particular, the security sub-system 114 described above, it is contemplated that the process 500 may be at least partially performed by the memory device 104 or other suitable memory component.

The security sub-system 114 receives parity information from the storage sub-system 108 (at block 502). For example, the parity information may be a XOR snapshot, such as XOR snapshot 112. In some embodiments, the security sub-system 114 receives parity information from the storage sub-system 108 in response to the storage sub-system 108 receiving a parity information back-up request. In some embodiments, the XOR snapshot 112 is received by the Bluetooth® controller 115 of the security sub-system 114. For example, the memory 110 of the storage sub-system 108 may send the XOR snapshot to the Bluetooth® controller 115 and, in particular, a Bluetooth® transceiver of the Bluetooth® controller 115.

Once the security sub-system 114 receives the parity information from the storage sub-system 108, the security sub-system 114 outputs the parity information to an external device, such as external device 130 (at block 504). In some embodiments, the security sub-system 114 provides the XOR snapshot 112 to the external device 130 via the Bluetooth® transceiver of the Bluetooth® controller 115. Alternatively, or additionally, in some embodiments, the security sub-system 114 provides the XOR snapshot 112 to the host device 120. In some embodiments, the external device 130 executes an application (e.g., application 122) that receives the XOR snapshot 112. For example, when the external device 130 executes the application 122, the XOR snapshot 112 is stored in a database, such as database 124. In some embodiments, the security sub-system 114 may encrypt the XOR snapshot 112 when it is output to the external device 130. In some embodiments, the security sub-system 114 determines that the external device 130 has Bluetooth® capabilities prior to outputting the XOR snapshot 112. For example, the security sub-system 114 may determine that Bluetooth® is enabled on the external device 130 and/or the host device 120.

Figure 6:
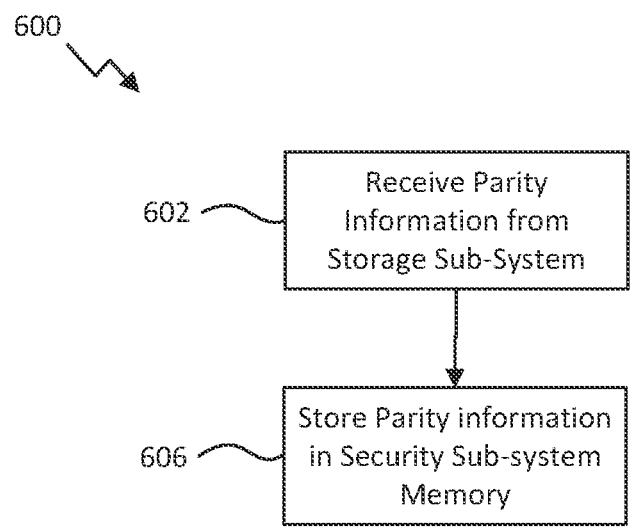
FIG. 6 is a flowchart illustrating a method for storing parity information in the security sub-system memory, in accordance with some embodiments of the disclosure.

FIG. 6 is a flowchart illustrating a method 600 for storing parity information in the security sub-system memory 117, according to some embodiments. It is understood that the process 600 may be stored in a memory, such as memory device 104, and executed by a processor, such as processor 119. However, it is contemplated that some or all of the process 600 may be performed on the memory device 104, such as via the read/write circuitry 111. Accordingly, while the process 600 is described in regards to the controller 106, and in particular, the security sub-system 114, and its associated components described above, it is contemplated that the process 600 may be at least partially performed by the memory device 104 or other suitable memory component. In some embodiments, the process 600 may be executed in conjunction with process 500.

The security sub-system 114 receives parity information from the storage sub-system 108 (at block 602). For example, the parity information may be a XOR snapshot, such as XOR snapshot 112. In some embodiments, the security sub-system 114 receives parity information from the storage sub-system 108 in response to the storage sub-system 108 receiving a memory transfer request. In some embodiments, the XOR snapshot 112 is received by the Bluetooth® controller 115 of the security sub-system 114. For example, the memory 110 of the storage sub-system 108 may send the XOR snapshot to the Bluetooth® controller 115 and, in particular, a Bluetooth® transceiver of the Bluetooth® controller 115.

Once the security sub-system 114 receives the parity information from the storage sub-system 108, the security sub-system 114 stores the parity information in a security sub-system memory, such as security sub-system memory 117 (at block 604). For example, the security sub-system memory 117 may be a SRAM. Alternatively, or additionally, in some embodiments, the XOR snapshot 112 may still be stored in the memory device 104 at a predetermined rate that is lower than conventional rates, where the predetermined rate reduces some of the overhead experienced by the memory device 104 with respect to the conventional rates. In some embodiments, the memory device 104 may be NAND. In some embodiments, the XOR snapshot 112 is stored in the NAND in a non-blocking manner.

Figure 7:
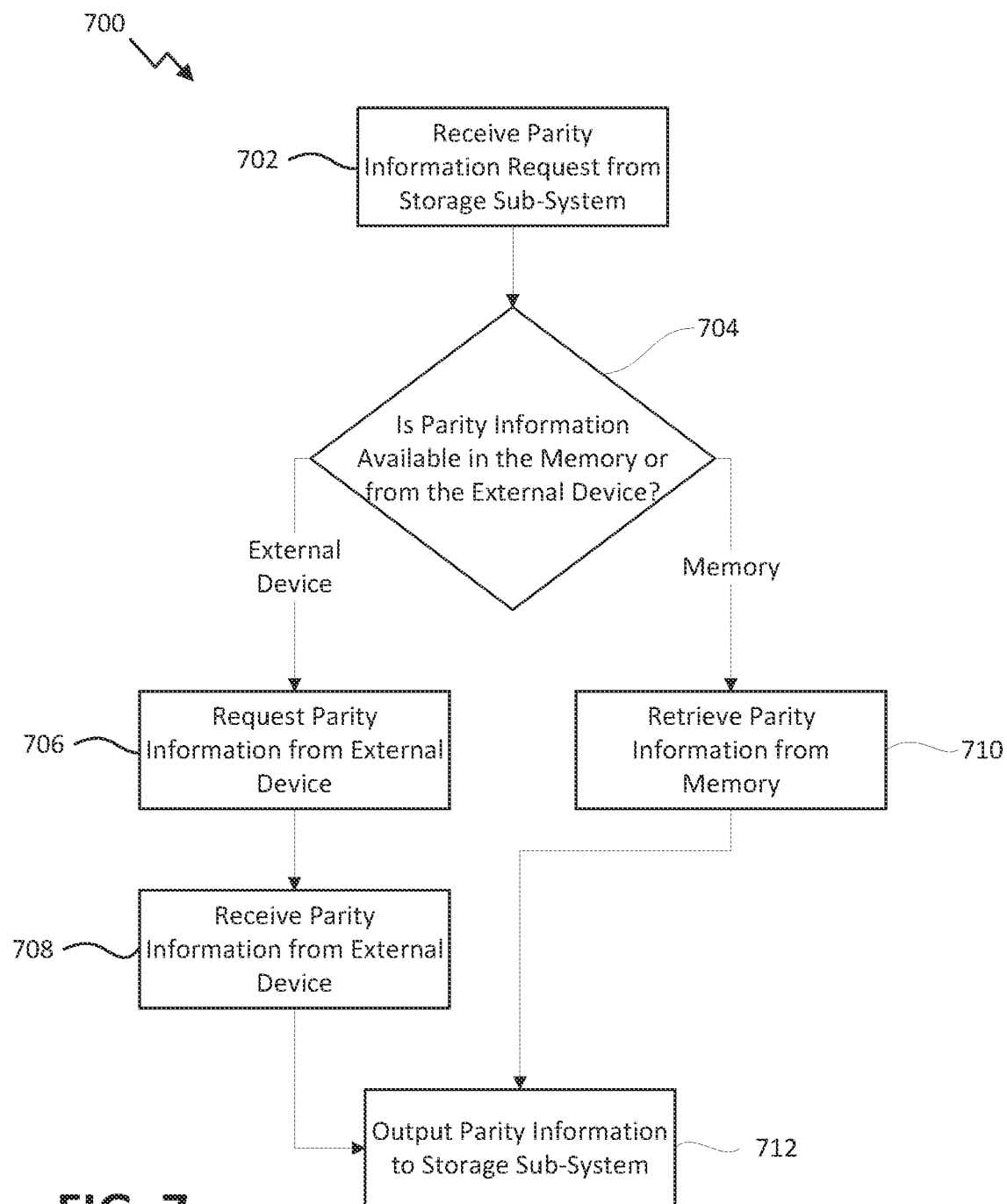
FIG. 7 is a flowchart illustrating a process for retrieving parity information, in accordance with some embodiments of the disclosure.

FIG. 7 is a flowchart illustrating a method 700 for retrieving parity information, according to some embodiments. It is understood that the process 700 may be stored in a memory, such as memory device 104, and executed by a processor, such as processor 119. However, it is contemplated that some or all of the process 700 may be performed on the memory device 104, such as via the read/write circuitry 111. Accordingly, while the process 700 is described in regards to the controller 106, and in particular, the security sub-system 114, and its associated components described above, it is contemplated that the process 700 may be at least partially performed by the memory device 104 or other suitable memory component.

The security sub-system 114 receives a parity information request from the storage sub-system 108 (at block 702). In some embodiments, the parity information request is a request for the retrieval of the XOR snapshot 112. In some embodiments, the security sub-system 114 receives the parity information request from the storage sub-system 108 in response to the storage sub-system initiating a parity information retrieval request. For example, the parity information retrieval request may be initiated when a read command results in a data disturbance and the parity information 112 from the storage sub-system 108 may be used to compute the data back (e.g., recover data by reducing or eliminating the data disturbance with respect to disturbed data). When the security sub-system 114 receives a parity information request from the storage sub-system 108, the security sub-system 114 determines whether the parity information is available in the security sub-system memory 117 or from the external device 130 (at decision block 704). In some embodiments, the security sub-system first checks the security sub-system memory 117 to determine if the parity information is stored therein. When the security sub-system 114 determines that the parity information is available from the external device ("External Device" at decision block 704), the method 700 proceeds to block 706. When the security sub-system 114 determines that the parity information is available in the security sub-system memory 117 ("Memory" at decision block 704), the method proceeds to block 710.

At block 706, the security sub-system 114 requests the parity information from the external device 130. In some embodiments, a Bluetooth® transceiver of the Bluetooth® controller 115 may send a request to the wireless communication controller 402 of the external device 130 for the external device 130 to execute the application 122. For example, the external device 130 may execute the application 122 which retrieves the XOR snapshot 112 from the database 124 and/or the memory 404. The security sub-system 114 receives the parity information from the external device 130 (at block 708). In some embodiments, the Bluetooth® transceiver of the Bluetooth® controller 115 receives the XOR snapshot 112 from the memory 404 of the external device 130 via the wireless communication controller 402 of the external device 130. In response to receiving the parity information from the external device 130, the security sub-system 114 outputs the parity information to the storage sub-system 108 (at block 712). In some embodiments, the Bluetooth® transceiver of the Bluetooth® controller 115 outputs the XOR snapshot 112 to the memory 110 of the storage sub-system 108.

At block 710, the security sub-system 114 retrieves the parity information from the security sub-system memory 117. In some embodiments, the Bluetooth® transceiver of the Bluetooth® controller 115 retrieves the XOR snapshot 112 from the security sub-system memory 117. In response to retrieving the parity information from the security sub-system memory 117, the security sub-system 114 outputs the parity information to the storage sub-system 108 (at block 712). In some embodiments, Bluetooth® transceiver of the Bluetooth® controller 115 outputs the XOR snapshot 112 to the memory 110 of the storage sub-system 108. In some embodiments, the data storage device controller 106 performs parity operations with the retrieved parity information when the storage sub-system 108 receives the parity information. For example, parity operations include data recovery operations, data correction operations, or other suitable operations.

Figure 8:
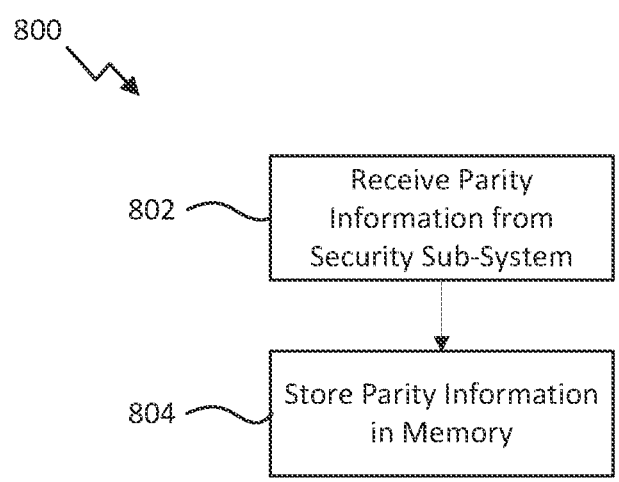
FIG. 8 is a flowchart illustrating a process for storing parity information in the memory of an external device, in accordance with some embodiments of the disclosure.

FIG. 8 is a flowchart illustrating a method 800 of storing parity information in the external device 130 of FIG. 1, according to some embodiments. It is understood that the process 800 may be stored in a memory, such as memory 404, and executed by a processor, such as processor 400. However, it is contemplated that some or all of the process 800 may be performed on the memory 404, such as via read/write circuitry. Accordingly, while the process 700 is described in regards to the external device 130 and its associated components described above, it is contemplated that the process 800 may be at least partially performed by the memory 404 or other suitable memory component.

The external device 130 receives parity information from a security sub-system, such as security sub-system 114 (at block 802). In some embodiments, a wireless communication controller of the external device 130, such as wireless communication controller 402, communicates with the Bluetooth® controller 115 of the security sub-system 114 to receive an XOR snapshot 112. For example, the wireless communication controller 402 may include a Bluetooth® controller including a Bluetooth® transceiver. In some embodiments, the parity information is encrypted when received from the security sub-system 114. When the wireless communication controller 402 receives the parity information from the security sub-system 114, the electronic processor 400 of the external device 130 stores the parity information in the memory 404 (at block 804). In some embodiments, the memory 404 includes an application 122 that, when executed by the electronic processor 400, stores the XOR snapshot 112 in the memory 404. For example, the application 122, when executed by the electronic processor 400, may store the XOR snapshot 112 in a database 124 within the application 122.

Figure 9:
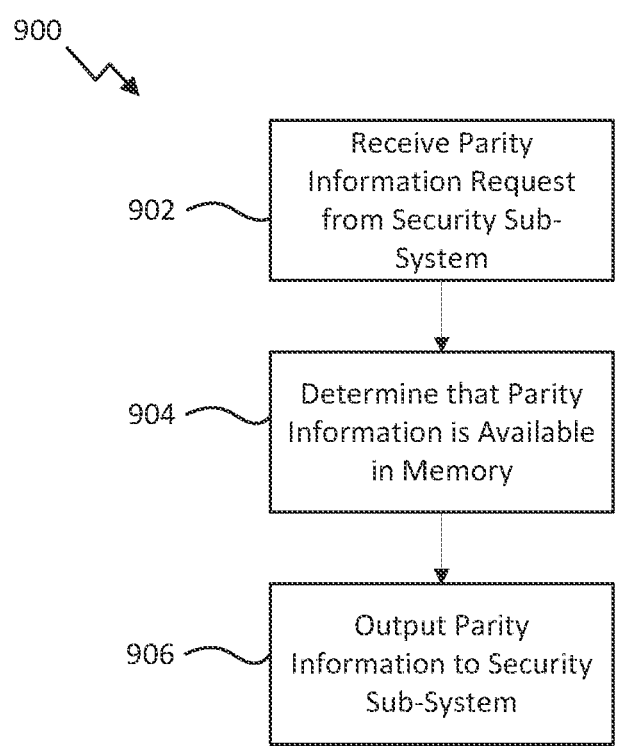
FIG. 9 is a flowchart illustrating a process for outputting parity information to the security sub-system, in accordance with some embodiments of the disclosure.

FIG. 9 is a flowchart illustrating a method 900 of outputting parity information from the external device 130 of FIG. 1, according to some embodiments. It is understood that the process 800 may be stored in a memory, such as memory 404, and executed by a processor, such as processor 400. However, it is contemplated that some or all of the process 800 may be performed on the memory 404, such as via read/write circuitry. Accordingly, while the process 700 is described in regards to the external device 130 and its associated components described above, it is contemplated that the process 800 may be at least partially performed by the memory 404 or other suitable memory component.

The external device 130 receives a parity information request from a security sub-system, such as security sub-system 114 (at block 902). In some embodiments, a wireless communication controller, such as wireless communication controller 402, communicates with the Bluetooth® transceiver of the Bluetooth® controller 115 of the security sub-system 114 to receive the parity information request. For example, the security sub-system 114 may wish to retrieve the XOR snapshot 112 from the external device 130. In some embodiments, the external device 130 receives a first identifier (e.g., a universally unique identifier ("UUID"), token, or other suitable identifying information) that is associated with the parity information that the security sub-system 114 wishes to retrieve along with, or subsequent to the parity information request. For example, the first identifier may be specific to the XOR snapshot 112 that the security sub-system 114 is requesting from the external device 130. In some embodiments, the first identifier may be generated, maintained, and provided by the security sub-system 114 along with the parity information when the parity information is received by the external device 130. In other embodiments, the first identifier may be generated, maintained, and provided by the storage sub-system 108.

In some embodiments, the electronic processor 400 of the external device 130 stores the first identifier in the memory 404 along with the parity information. When the external device 130 receives the parity information request from the security sub-system 114, the electronic processor 400 of the external device 130 determines that the parity information is available in the memory 404 of the external device 130 (at block 904). In some embodiments, the electronic processor 400 executes the application 122 (stored within the memory 404) to determine that the XOR snapshot 112 is within memory 404. The electronic processor 400 may use the first identifier to locate the parity information in the memory 404 of the external device 130. In some embodiments, the electronic processor 400 matches that first identifier to an identifier (i.e. the stored first identifier) of the parity information in the memory 404 to determine that the requested parity information (i.e., the parity information requested by the parity information request) is in the memory 404. In some embodiments, the external device 130 may store first parity information from a first data storage device and second parity information of a second data storage device that is distinct from the first parity information. In that case, the first identifier may be associated with the particular data storage device that output the parity information request.

When the electronic processor 400 determines that the parity information is available in the memory 404, the external device 130 outputs the parity information to the security sub-system 114 (at block 906). In some embodiments, electronic processor 400 may execute the application 122 which outputs the XOR snapshot 112 via the wireless communication controller 402. For example, the wireless communication controller 402 outputs the XOR snapshot 112 to the Bluetooth® transceiver of the Bluetooth® controller 115 of the security sub-system 114. In some embodiments, the output parity information is encrypted by the external device 130 and decrypted when received by the security sub-system 114.

The Abstract is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separately claimed subject matter.

What is claimed is:

1. A data storage device, comprising:
a memory;
a data storage device controller coupled to the memory and including a storage sub-system and a security sub-system, the storage sub-system including parity information within a second memory;
a first bus configured to facilitate a transfer of a first copy of the parity information between the data storage device controller and a dedicated memory of an external device in communication with the data storage device controller, wherein the dedicated memory is dedicated to storing parity information; and
a second bus configured to receive host commands, send responses to the host commands, and facilitate a transfer of a second copy of the parity information between the data storage device controller and a host device in communication with the data storage device controller, the host device being separate and distinct from the external device,
wherein the data storage device controller is configured to:
initiate a parity information back-up request,
send, from the second memory of the storage sub-system, the parity information to the security sub-system based on the initiation of the parity information back-up request, and
control the security sub-system to transmit the first copy of the parity information to the external device.

2. The data storage device of claim 1, wherein the security sub-system wirelessly transmits the first copy of the parity information to the dedicated memory of the external device with a Bluetooth® transceiver, and wherein the first bus is coupled to the security sub-system.

3. The data storage device of claim 1, wherein the parity information back-up request is initiated by the data storage device controller in response to a power down of the data storage device.

4. The data storage device of claim 1, wherein the parity information back-up request is initiated by the data storage device controller in response to at least one of a set fixed time interval or a power down of the data storage device.

5. The data storage device of claim 4, wherein the set fixed time interval is in a range of 0.5 seconds to 30 seconds.

6. The data storage device of claim 1, wherein the storage sub-system sends the parity information to the security sub-system via an internal bus.

7. The data storage device of claim 1, wherein the security sub-system encrypts the first copy of the parity information prior to providing the first copy of the parity information to the dedicated memory of the external device with a Bluetooth® transceiver.

8. The data storage device of claim 1, wherein the data storage device controller is further configured to:
provide, from the second memory of the storage sub-system, the parity information to a third memory of the security sub-system, and
store the parity information in the third memory of the security sub-system.

9. The data storage device of claim 8, wherein the data storage device controller is further configured to:
initiate a parity information retrieval request,
request, with the storage sub-system, the parity information from the security sub-system,
retrieve, with the security sub-system, the parity information from the third memory,
output, with the security sub-system, the parity information to the storage sub-system, and
perform, with the storage sub-system, a parity operation with the parity information that is output.

10. The data storage device of claim 1, wherein the data storage device controller transmits the first copy of the parity information from a third memory of the security sub-system to the dedicated memory of the external device.

11. A method of backing-up parity information, the method comprising:
initiating, with an electronic processor, a parity information back-up request;
controlling, with the electronic processor, a storage sub-system coupled to the electronic processor to send parity information from a memory of the storage sub-system to a security sub-system coupled to the electronic processor based on the initiation of the parity information back-up request;
controlling, with the electronic processor, the security sub-system to transmit a first copy of the parity information to a dedicated memory of an external device via a first bus; and
controlling, with the electronic processor, a host interface coupled to a second bus to transmit a second copy of the parity information to a host device that is separate and distinct from the external device,
wherein the dedicated memory is dedicated to storing parity information, and
wherein the second bus is configured to receive host commands, send responses to the host commands, and facilitate the transmission of the second copy of the parity information to the host.

12. The method of claim 11, further comprising:
controlling the storage sub-system to provide the parity information from the memory of the storage sub-system to a memory of the security sub-system; and
controlling the security sub-system to store the parity information in the memory of the security sub-system.

13. The method of claim 12, further comprising:
initiating a parity information retrieval request;
controlling the storage sub-system to request the parity information from the security sub-system based on the initiation of the parity information retrieval request; and
determining whether the parity information is available in the memory of the security sub-system or whether the first copy of the parity information is available from the external device.

14. The method of claim 13, further comprising:
controlling the security sub-system to retrieve, in response to determining that the parity information is available in the memory of the security sub-system, the parity information from the memory of the security sub-system;
controlling the security sub-system to output the parity information to the storage sub-system; and
controlling the storage sub-system to perform a parity operation with the parity information that is output.

15. The method of claim 13, further comprising:
controlling the security sub-system to request, in response to determining that the first copy of the parity information is available from the external device, the first copy of the parity information from the external device;
receiving the first copy of parity information from the external device;
controlling the security sub-system to output the first copy of the parity information to the storage sub-system; and
controlling the storage sub-system to perform a parity operation with the first copy of the parity information that is output.

16. A non-transitory computer readable medium including computer executable instructions that, when executed by an electronic processor, causes the electronic processor to perform a set of operations comprising:
initiating a parity information back-up request;
controlling a storage sub-system to send parity information from a memory of the storage sub-system to a security sub-system based on the initiation of the parity information back-up request;
controlling the security sub-system to transmit a first copy of the parity information to a dedicated memory of an external device via a first bus; and
controlling a host interface coupled to a second bus to transmit a second copy of the parity information to a host device that is separate and distinct from the external device,
wherein the dedicated memory is dedicated to storing parity information, and
wherein the second bus is configured to receive host commands, send responses to the host commands, and facilitate the transmission of the second copy of the parity information to the host.

17. The computer readable medium of claim 16, wherein the computer executable instructions cause the electronic processor to perform the set of operations further comprising:
controlling the storage sub-system to provide the parity information from the memory of the storage sub-system to a memory of the security sub-system; and
controlling the security sub-system to store the parity information in the memory of the security sub-system.

18. The computer readable medium of claim 17, wherein the computer executable instructions cause the electronic processor to perform the set of operations further comprising:
initiating a parity information retrieval request;
controlling the storage sub-system to request the parity information from the security sub-system based on the initiation of the parity information retrieval request; and
controlling the security sub-system to determine whether the parity information is available in the memory of the security sub-system or whether the first copy of the parity information is available from the external device.

19. The computer readable medium of claim 18, wherein the computer executable instructions cause the electronic processor to perform the set of operations further comprising:
controlling the security sub-system to retrieve, in response to determining that the parity information is available in the memory of the security sub-system, the parity information from the memory of the security sub-system;
controlling the security sub-system to output the parity information to the storage sub-system; and
controlling the storage sub-system to perform a parity operation with the parity information that is output.

20. The computer readable medium of claim 18, wherein the computer executable instructions cause the electronic processor to perform the set of operations further comprising:
controlling the security sub-system to request, in response to determining that the first copy of the parity information is available from the external device, the first copy of the parity information from the external device;
controlling the security sub-system to receive the first copy of the parity information from the external device;
controlling the security sub-system to output the first copy of the parity information to the storage sub-system; and
controlling the storage sub-system to perform a parity operation with the first copy of the parity information that is output.

* * * * *